INVENTORS
VICTOR E. SCOTTO
MAURICE W. BLACKWELDER
BY
Ward McLennon Brooks Fitzpatrick
ATTORNEYS

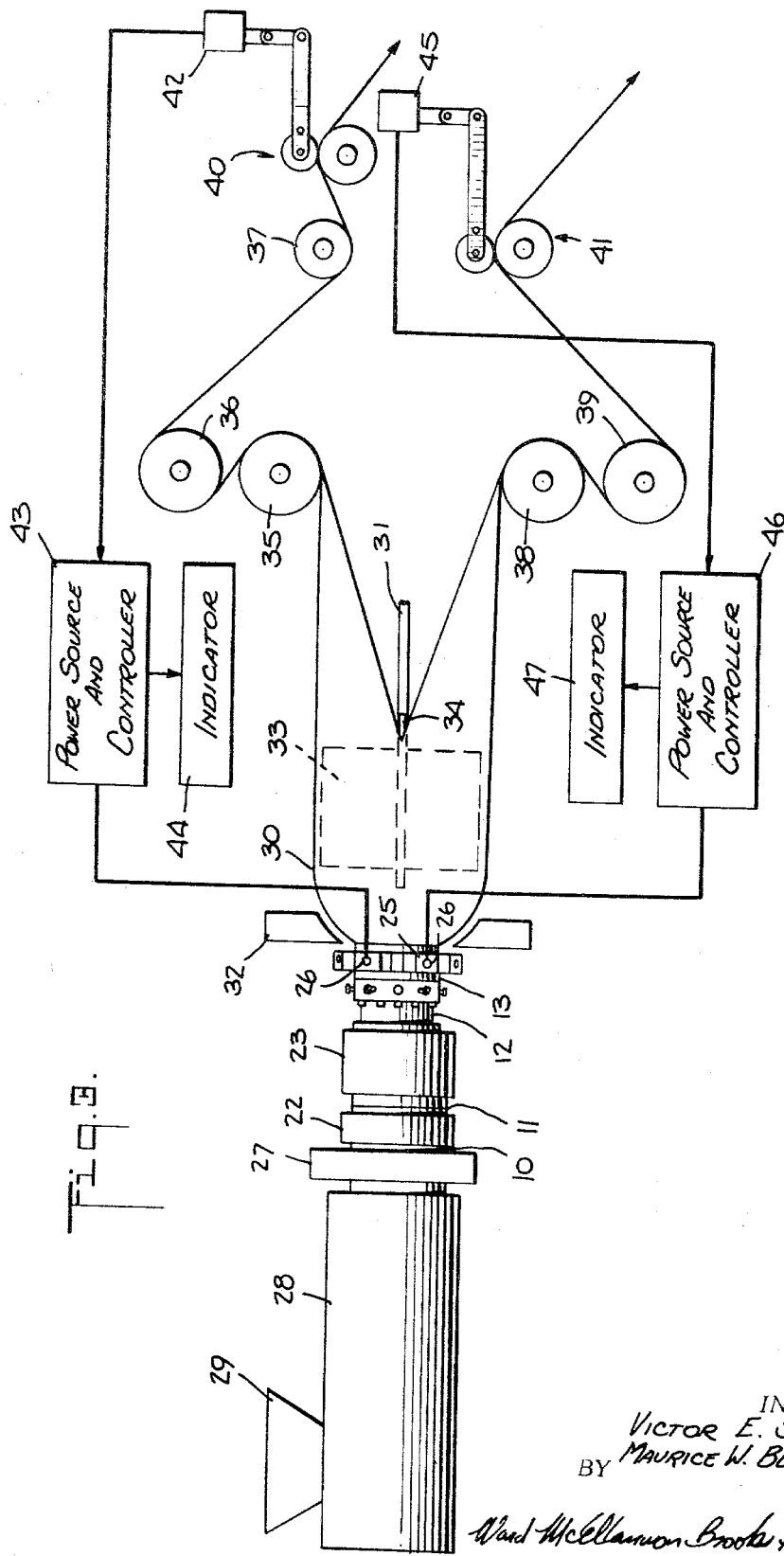

United States Patent Office 3,751,537
Patented Aug. 7, 1973

3,751,537
PROCESS FOR CONTROLLING DIMENSIONS OF THE PRODUCT IN FOAMED PLASTIC EXTRUSION
Victor Edward Scotto, Uniondale, and Maurice W. Blackwelder, Deer Park, N.Y., assignors to Owens-Illinois, Inc.
Filed Jan. 12, 1970, Ser. No. 2,005
Int. Cl. B29d 7/02, 23/00, 27/00; B29f 3/08
U.S. Cl. 264—40
3 Claims

ABSTRACT OF THE DISCLOSURE

Caliper in the cross direction in webs of extruded foamed plastic produced by longitudinal slitting of a tubular extrusion is controlled by differentially heating the extrusion die circumferentially about its axis. This can be accomplished by locating a plurality of independently controllable heaters around the die.

---

The present invention relates to the extrusion of plastic material. The invention will be described in connection with the extrusion of foamable plastics with which is has been successfully employed.

It has been known that sheets or thin walled sections of foamed plastic can be produced by extruding a quantity of foamable plastic in the form of a tube whereupon the tube is slit longitudinally and unfolded to produce the sheet elements. The satisfactory extrusion of such foamable plastics has proven to be no simple matter. It has been found difficult, if not impossible, to maintain close tolerances on certain dimensions of the resultant sheet material. In particular, it has been a problem to maintain uniform thickness or caliper throughout the cross dimension or width of sheets or webs produced by the aforementioned method.

While uniform caliper is desirable for many reasons, it is particularly important if the surface of the sheet is to be printed. If the thickness varies excessively, the print rolls or platens will be unable to follow the contour resulting in skips or uneven application of ink. The control obtainable with prior fabrication methods has proven inadequate.

One method known heretofore and in widespread use in the plastic extrusion art for controlling cross direction caliper or gauge involves using an adjustable die ring, the concentricity of which can be adjusted with respect to a core rod mandrel. It has been found, however, that this arrangement does not provide adequate adjustment for eliminating variation in caliper or thickness across the width of a resultant sheet extrusion.

Flexible lip dies of the type described in Pat. No. 3,349,436 have been tried and found, particularly with larger diameter die orifices, also to be incapable of producing webs of uniform thickness.

It is, therefore, an object of the present invention to provide both a process and apparatus for producing webs, particularly wide webs, of foamed plastic with uniform caliper across the width of the web.

Another object of the present invention is to prepare foamed plastic sheets of wider usable dimension than those produced heretofore.

A still further object of the invention is to utilize means for effecting greater control over the caliper of plastic products produced by extrusion.

In accordance with one aspect of the invention, there is provided a process for producing dimensionally controlled articles of foamed plastic material which comprises the steps of plasticizing a quantity of thermoplastic material by the application of heat, forcing the plasticized material through the orifice of a die, and effecting caloric exchange with the die, which exchange is non-uniform circumferentially about the die and selected to control a dimension of the extruded article. As an example, the process may be practiced by utilizing a die with an annular orifice for producing a tubular extrusion and heating the die nonuniformly about its axis.

The invention will be better understood after reading the following detailed description of a presently preferred embodiment thereof with reference to the appended drawings wherein:

FIG. 3 is a diagrammatic illustration of an automatic system employing the adapter and die of FIGS. 1 and 2.

Throughout the several views of the drawings, the same reference numerals are used to designate the same or similar parts.

Figure 1:
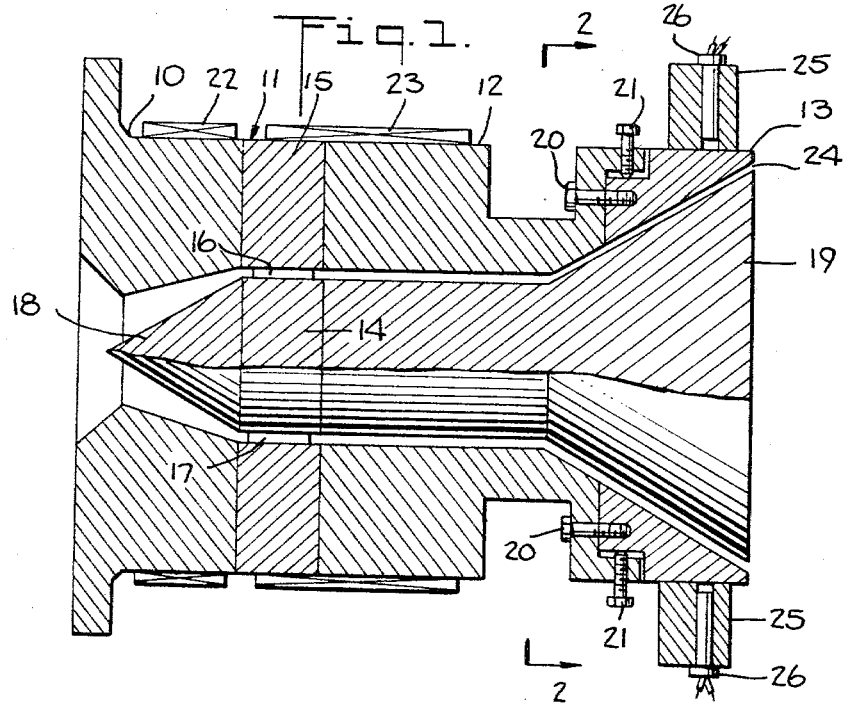
FIG. 1 is a longitudinal sectional view through a diagrammatic representation of an adapter and die assembly embodying the present invention.
Figure 2:
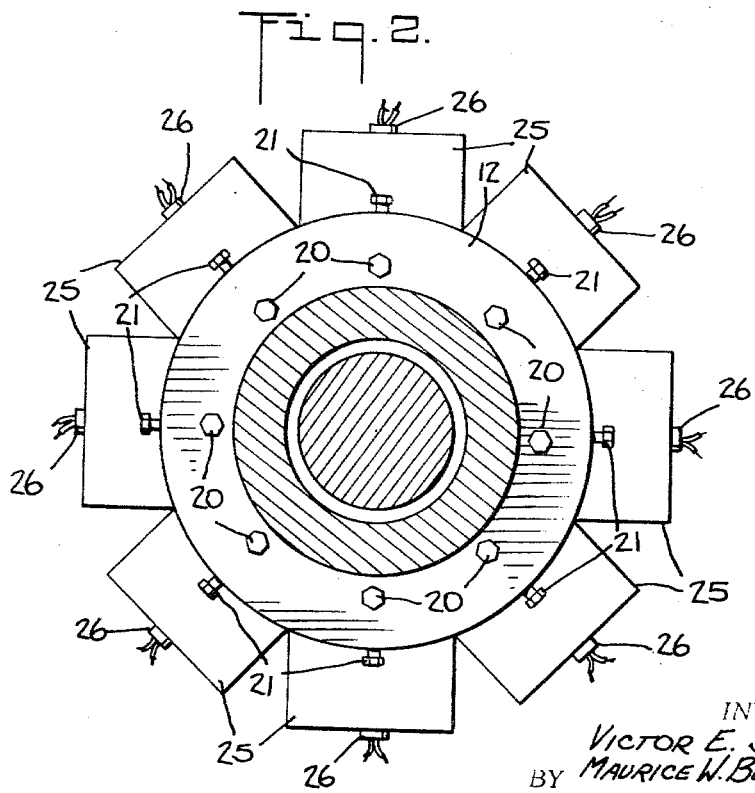
FIG. 2 is a transverse sectional view taken along the line 2—2 in FIG. 1.

Referring to FIGS. 1 and 2, an adapter ring 10 is shown joined in sequence to a spider ring 11, a main die body 12, and an outer die ring or funnel 13. The spider ring 11 has a hub section 14 joined to the peripheral section 15 by a plurality of circumferentially spaced radial webs, such as that seen at 16 and 17. A nose cone 18 is secured to one side of the hub 14, while a sizing cone or core member 19 is secured to the other side of the hub 14.

As best seen in FIG. 2, the ring 13 is secured to the die body 12 by a plurality of bolts all designated by the numeral 20. When the bolts 20 are loosened, the ring 13 may be adjusted relative to the axis of the extruder for coarse control of caliper by means of the adjusting screws 21. Band heating elements 22 and 23 are located around the members 10, 11, and 12, as shown.

It should be appreciated that the structure described to this point is conventional and would be secured to the forward end of an extruder cylinder in known fashion. Likewise the particular die illustrated has a circular orifice 24 for producing, in known manner, a tubular extrusion. For the purpose of the present specification the term "die" may be considered as encompassing the entire structure shown in FIGS. 1 and 2 unless a contrary meaning is evident from the context.

In accordance with the present invention, the die ring or funnel ring 13 has secured to its periphery (by bolts or other means, not shown) a plurality, here shown as eight, heating blocks 25, each provided with an internal electric heater 26. The blocks 25 should be constructed of metal with good heat transfer characteristics and, although not shown in the drawing, the blocks should also be appropriately insulated externally against undesired heat loss. In use, each of the heaters 26 should be connected electrically to a suitable source of electric power, each adjustable independently either manually or automatically as described hereinafter.

For the purpose of producing sheet material use may be made of the arrangement shown diagrammatically in FIG. 3 to which attention is now directed. The adapter and die assemby of FIGS. 1 and 2 is shown mounted by means of a clamp ring 27 at the end of an extruder cylinder 28 fed from a hopper 29. As the tubular extrusion 30 leaves the die, it is expanded by air under pressure supplied through a conduit 31 and drawn through a cooling or chilling ring 32 over a sizing mandrel 33. The extrusion then passes a pair of diametrically opposed knives, one of which is shown at 34, which slit the tubing longitudinally on opposite sides thereof. The severed sections of the tubing are then flattened and passed over feed and tensioning rolls 35, 36, 37, 38, and 39 to respective gauging stations 40 and 41. In the present example, where eight heating blocks 25 are mounted around the die funnel 13, there should be an equal number of independent thickness gauges located uniformly spaced across the width of the corresponding webs with half at station 40 and half at station 41. For purpose of clarity, only the first gauge element nearest the observer in each station is illustrated. As shown, the gauge 42 at station 40 is connected to a power source and controller 43 which, in turn, is connected both to the corresponding heater element 26 and to an indicator 44. In a similar manner, the gauge 45 at station 41 is connected to a power source and controller 46 which is connected to its corresponding heater element 26 and to an indicator 47.

It will be understood that the gauges at stations 40 and 41 may be of any known design. As shown in FIG. 3, an electrical strain gauge with associated contact linkage is employed. While a contact type gauge is presently preferred, a capacitance-type gauge or a beta radiation gauge may be employed in known manner. It should also be understood that each of the other gauges located but not shown at the separate stations 40 and 41 will be connected through a corresponding power source and controller to the corresponding heater and to an associated indicator. The arrangement is such that when a gauge detects a thickness less than its preset magnitude, it will cause the associated heater to raise the temperature of the corresponding heating block while the converse will occur if the gauge senses an excessive thickness. At the same time, the indicator provides the operator with a visual indication of the caliper at each point.

The exact mechanism by which the non-uniform application of heat circumferentially about the die controls the gauge of the extruded material is not fully understood. One possible expanation is that the non-uniform application of heat to the ring 13 causes differential thermal expansion of the ring to help achieve perfect concentricity with the core rod or mandrel.

Experimentally, it has been determined that changes in thickness can be obtained by applying heat non-uniformly around the adapter ring 10. However, it is not clear and has not been established whether the non-uniform application of heat at the adapter ring serves to compensate for non-uniformly heated material received from the extrusion cylinder or imposes a non-uniform temperature gradient throughout the material as it passes through the die. Furthermore, it is also theoretically possible that by virtue of heat transfer between the material and the die there exists some interrelationship affecting the termal expansion of the latter to achieve more uniform concentricity with the mandrel.

Regardless of the theory, it has been found impossible prior to the present invention to obtain close tolerance control of the thickness in the cross direction. The non-uniform application of heat has been found to afford extremely accurate control over the thickness or gauge of the extruded material in the cross direction. It is to be understood, of course, that instead of a plurality of heaters distributed circumferentially around the die, use may be made of a plurality of cooling units so distributed. It is also contemplated that a combination of both may be employed. Hence, the invention contemplates non-uniform caloric exchange circumferentially around the die.

To afford an indication of the effectiveness of the invention it is noted that polystyrene foam has been extruded both with and without the aid of the invention described above. As a result, it has been established that with the aid of the present method it is possible to produce simultaneously two webs each with a width in excess of 30" and with a variation in thickness in the cross direction which, for any nominal thickness within the range of 30 to 50 mils, is less than ±1 mil. By contrast, the best control obtained heretofore on 20" wide webs without the differential heating control within the same thickness range was about ±3 mils in the cross direction. This involved the use of a die with a flexible lip. However, without the control offered by either the flexible lip or the differential heating as described in the present application, the errors in caliper in the cross direction of webs having a thickness within the range of 30 to 50 mils run as high as 10 to 12 mils. It, therefore, should be evident that the new apparatus and process provides for uniformity in control of thickness not heretofore obtainable.

When extruding polystyrene foam with the extruder of FIG. 3, the temperature of the die ring 12 may be maintained at approximately 295° F. while the heater blocks 25 may be operated at temperatures ranging between 295° and 305° F. It has been found that this small range of temperature variation is capable of causing a significant change in gauge or caliper.

Although eight heating blocks have been shown in the drawings and described above, it should also be apparent that the number of blocks may be varied to suit the particular situation. More blocks may be used if finer control is desired or with larger diameter dies. In addition, it should be apparent that the invention is applicable to dies having orifices other than annular. For example, the invention could be applied to the control of gauge or caliper in the production of sheet material directly through a straight slit-type orifice. In other words, all that is required is that means be provided for effecting independently selectable caloric exchange with circumferentially adjacent portions of the die along and on at least one side of the orifice.

For purpose of illustration, an arrangement for automatic control has been shown in FIG. 3. However, it should be evident that the heaters 26 can be controlled manually by an operator in response to any suitable downstream measurement of the uniformity in cross direction thickness of the resultant extrusion.

Throughout the foregoing discussion repeated reference has been made to variation of dimension in the cross direction. Those skilled in the art will understand that there also will be variation in the machine or longitudinal direction due to conditions or circumstances unrelated to the problem at which the present invention is directed. Machine direction variation in gauge or caliper can be minimized in any known manner. Furthermore, it should also be apparent that the thickness gauges at stations 40 and 41 of FIG. 3, which are used for controlling the heating blocks, can also be used either individually or by averaging their output in an automatic control for machine direction gauge employing known apparatus.

The structure described above makes use of a plurality of independently controllable heaters for supplying heat non-uniformly circumferentially around the die lips. However, it is to be understood that similar control can be achieved by use of independently controllable cooling units. Furthermore, instead of using core heaters, strip heaters or the like may be employed. Alternatively, the electric heating elements may be eliminated and the heating blocks may be suitably cored and supplied with a fluid passing therethrough for the purpose of heat exchange. Either fluid temperature or flow rate may be used for control. Heat may be added or subtracted in this manner, as desired.

The invention has been described with reference to one embodiment thereof. However, it will be understood by those skilled in the art that various changes may be made in the construction of the equipment and in the operation of the process without departing from the true spirit and spoce of the invention.

What is claimed is:

1. In a process for continuously producing a sheet of foamed thermoplastic material in which the material is plastified and extruded with a foaming agent mixed therewith through an orifice of a die to form said sheet which is advanced away from said orifice as it is formed, said orifice being defined by lips and said die being heated to extrusion temperature and having a passageway leading to said orifice, the steps for controlling the thickness of said sheet across the width thereof comprising measuring the thickness of said sheet at a plurality of locations spaced from each other in a direction transverse to the direction of advance thereof, and controlling the thickness of said sheet at the portions thereof corresponding to said locations by adjusting the relative heating of a plurality of separate areas on said lips of said orifice and corresponding in number to the number of said locations and distributed along said lips, each area being the area on said lips which forms the portion of said sheet being measured at one of said locations and the heating of an area being increased to increase the thickness of the corresponding portion of the sheet and vice versa, thereby to provide heating at said lip areas of said die forming said orifice which is variable lengthwise of said orifice dependent upon the thickness of said sheet at said locations.

2. In a process of continuously producing a sheet of foamed thermoplastic material in which the material is plastified and extruded with a foaming agent mixed therewith through an annular orifice of a die to form a tube of said material which is advanced in a direction away from said orifice and which is slit lengthwise, as it is advanced, to form said sheet, said orifice being defined by lips and said die being heated to extrusion temperature and having an annular passageway leading to said orifice, the steps for controlling the thickness of said sheet across the width thereof comprising measuring the thickness of said sheet at a plurality of locations spaced from each other in a direction transverse to the direction of advance thereof, and controlling the thickness of said sheet at the portions thereof corresponding to said locations by adjusting the relative heating of a plurality of separate areas on said lips of said orifice and corresponding in number to the number of said locations and distributed circumferentially around said lips, each area being the area on said lips which forms the portion of said sheet being measured at one of said locations and the heating of an area being increased to increase the thickness of the corresponding portion of the sheet and vice versa.

3. In a process for continuously producing a sheet of foamed thermoplastic material, in which the material is plastized and extruded with a foaming agent mixed therewith, through an orifice of a die to form said sheet which is advanced away from said orifice as it is formed, said orifice being defined by lips and said die being heated to extrusion temperature and having a passageway leading to said orifice, the steps for controlling the thickness of said sheet across the width thereof comprising measuring the thickness of said sheet at a plurality of locations spaced from each other in a direction transverse to the direction of advance thereof, and controlling the thickness of said sheet at portions thereof corresponding to said locations by adjusting the relative temperatures of a plurality of separate areas on said lips and corresponding in number to the number of said locations and distributed along said lips, each said area being the area on said lips which forms the portion of said sheet being measured at one of said locations to thereby provide temperatures at said areas which are variable lengthwise of said orifice dependent upon the thickness of said sheet at said locations, the temperature of an area being increased to increase the thickness of the corresponding portion of the sheet and vice versa.

References Cited
UNITED STATES PATENTS

| | | | |
|---|---|---|---|
| 3,609,809 | 10/1971 | Slicker | 425—144 |
| 2,740,157 | 4/1956 | McCurdy et al. | 264—53 |
| 3,422,175 | 1/1969 | Rowland | 264—75 |
| 3,608,145 | 9/1971 | Baker et al. | 18—5 P X |
| 3,341,388 | 9/1967 | Bunyea | 264—40 |
| 3,118,846 | 1/1964 | Boyer | 264—127 |
| 3,288,895 | 11/1966 | Windeler | 264—40 |
| 3,507,939 | 4/1970 | Williams et al. | 264—177 X |

OTHER REFERENCES

Ferrigno, T. H.: Rigid Plastic Foams," New York, Reinhold, 1963, pp. 148–150.

Bender, Rene J.: "Handbook of Foamed Plastics," Libertyville, Ill., Lake Publishing Corp. © 1965, pp. 270–275.

Benning, Calvin J.: "Plastic Foams"—"The Physics and Chemistry of Product Performance and Process Technology," vol. 1. "Chemistry and Physics of Foam Formation," New York, Wiley-Interscience © M69, pp. 22–34.

Tordella, J. P.: "Melt Fracture-Extrudate Roughness in Plastics Extrusion." In SPE Journal, February 1956, pp. 36–40.

Schulken, R. M., and R. E. Boy: "Cause of Melt Fracture; How it is Related to Extrusion Behaviour." In SPE Journal, April 1960, pp. 423–428.

Cogswell, B. N., and P. Lamb: "Polymer Properties Relevant in Melt Processing." In Plastics & Polymers, October 1970, pp. 331–342.

DuBois, J. H., and W. I. Pribble, editors, "Plastics Mold Engineering," New York, Reinhold, © 1965, pp. 509–516, 518–524.

Dilley, B. R.: "The Use of Chemical Blowing Agents in Direct Extrusion Expansion." In Trans. J. Plastics Inst., February 1966, pp. 17–20.

Willer, A. M.: "Electronic Control for Plastic Tube or Pipe Wall Thickness." In SPE Journal, December 1961, pp. 1279–1281.

Collins, F. H.: "Controlled Density Polystyrene Foam Extrusion." In SPE Journal, July 1960, pp. 705–709.

International Plastics Engineering, October 1964, "Barand Extrusion Plant for Thin Expanded Polystyrene Sheet," pp. 326–327.

PHILIP E. ANDERSON, Primary Examiner

U.S. Cl. X.R.

264—41, 48, 209, DIG. 13, DIG. 14; 425—144